(12) United States Patent
Hadley et al.

(10) Patent No.: US 8,136,755 B2
(45) Date of Patent: Mar. 20, 2012

(54) LANDING GEAR ASSEMBLY

(75) Inventors: Kevin Richard Hadley, Shropshire (GB); Andrew Robert Hawksworth, Shropshie (GB)

(73) Assignee: Goodrich Actuation Systems Limited, Solihull (GB)

( * ) Notice: Subject to any disclaimer, the term of this patent is extended or adjusted under 35 U.S.C. 154(b) by 909 days.

(21) Appl. No.: 12/178,200

(22) Filed: Jul. 23, 2008

(65) Prior Publication Data
US 2009/0026312 A1    Jan. 29, 2009

(51) Int. Cl.
*B64C 25/50* (2006.01)
(52) U.S. Cl. ................ 244/50; 244/103 R
(58) Field of Classification Search ........... 244/50, 244/100 R, 102 R, 103 R
See application file for complete search history.

(56) References Cited

U.S. PATENT DOCUMENTS

| | | | | | |
|---|---|---|---|---|---|
| 2,460,387 A | * | 2/1949 | Hunter | | 244/50 |
| 2,606,726 A | * | 8/1952 | Henion | | 244/50 |
| 2,652,214 A | * | 9/1953 | Cussons | | 244/50 |
| 2,687,857 A | * | 8/1954 | Caldwell et al. | | 244/50 |
| 2,756,949 A | * | 7/1956 | Smith | | 244/50 |
| 2,847,080 A | * | 8/1958 | Zworykin et al. | | 180/168 |
| 2,970,792 A | * | 2/1961 | Holmes | | 244/50 |
| 2,974,906 A | * | 3/1961 | Hrusch | | 244/50 |
| 2,988,056 A | * | 6/1961 | Rumsey | | 91/54 |
| 3,099,424 A | * | 7/1963 | Hrusch | | 244/50 |
| 3,211,400 A | * | 10/1965 | Booth | | 244/50 |
| 3,226,061 A | * | 12/1965 | Dowty et al. | | 244/50 |
| 3,391,580 A | * | 7/1968 | Stadler | | 74/388 R |
| 3,711,043 A | * | 1/1973 | Cameron-Johnson | | 244/50 |
| 3,762,670 A | * | 10/1973 | Chillson | | 244/50 |
| 3,977,631 A | * | 8/1976 | Jenny | | 244/50 |
| 4,401,285 A | * | 8/1983 | Simmonds | | 244/100 R |
| 4,730,788 A | * | 3/1988 | Metcalf et al. | | 244/50 |
| 4,930,590 A | * | 6/1990 | Love et al. | | 180/55 |
| 5,086,994 A | * | 2/1992 | Donnelly et al. | | 244/50 |
| 5,362,015 A | * | 11/1994 | Derrien et al. | | 244/50 |
| 5,810,112 A | * | 9/1998 | Bailey et al. | | 180/446 |
| 7,193,530 B2 | * | 3/2007 | Nance | | 340/960 |
| 7,445,178 B2 | * | 11/2008 | McCoskey et al. | | 244/50 |
| 7,469,858 B2 | * | 12/2008 | Edelson | | 244/103 S |
| 7,854,411 B2 | * | 12/2010 | Bucheton et al. | | 244/103 R |
| 2006/0065779 A1 | * | 3/2006 | McCoskey et al. | | 244/100 R |
| 2007/0158497 A1 | * | 7/2007 | Edelson et al. | | 244/103 S |

FOREIGN PATENT DOCUMENTS

JP      2005081916      *  3/2005

* cited by examiner

*Primary Examiner* — Joshua J Michener
(74) *Attorney, Agent, or Firm* — Andrus, Sceales, Starke & Sawall, LLP

(57) ABSTRACT

A landing gear assembly comprises a wheel support housing rotatably connected to a support member, the wheel support housing containing an electrically powered motor operable to adjust the angular position of the wheel support housing relative to the support member.

8 Claims, 2 Drawing Sheets

LANDING GEAR ASSEMBLY

Figure 1:
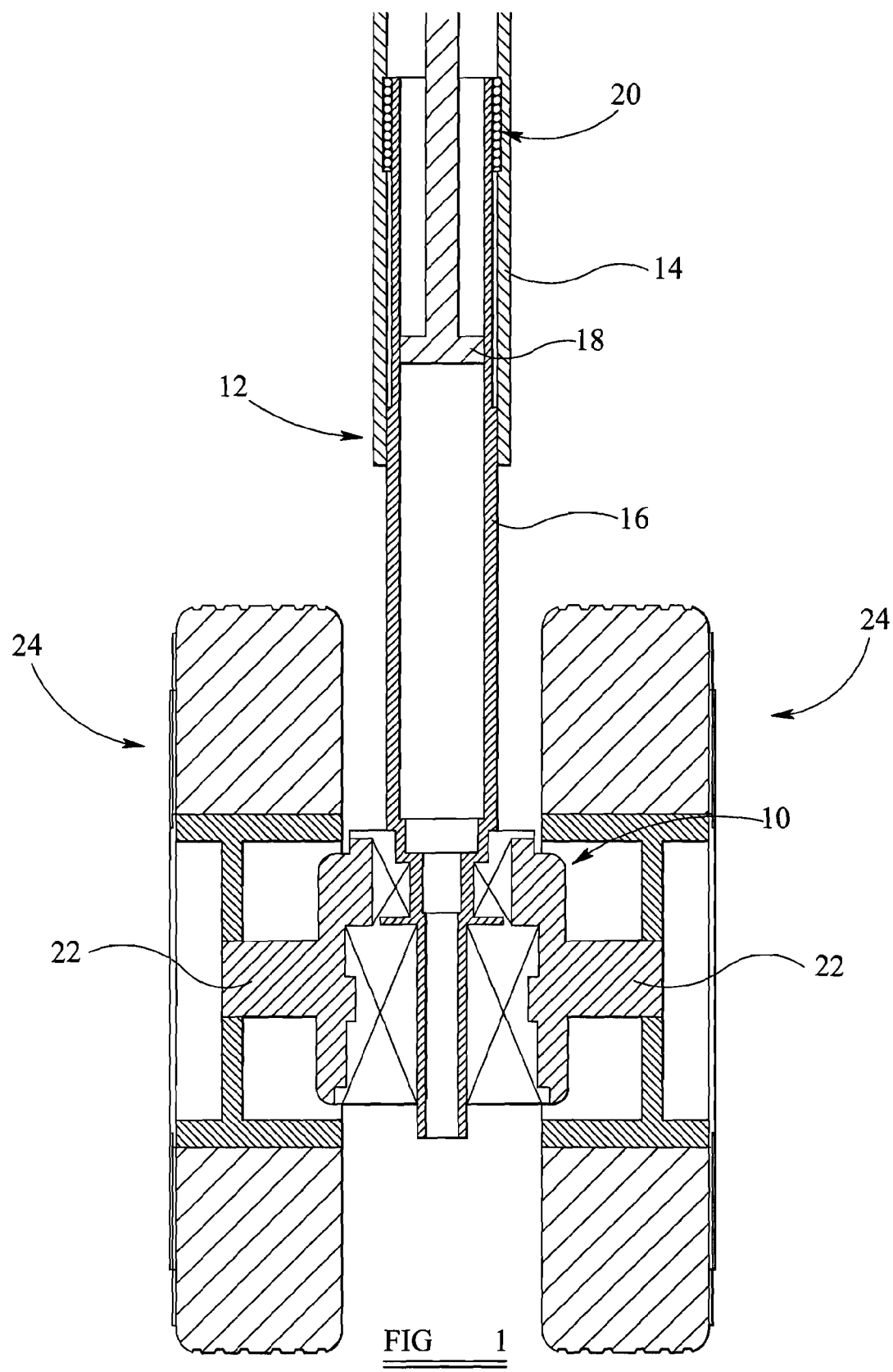

This invention relates to a landing gear assembly, and in particular to a steerable landing gear assembly intended for use in the nose landing gear of an aircraft.

The nose landing gear assembly of an aircraft typically comprises a hydraulic or pneumatic shock absorber arranged to carry, at its lower end, a wheel support housing carrying one, or preferably a pair of wheels arranged coaxially with one another on opposite sides of the wheel support housing. Where it is desirable to be able to adjust the orientation of the wheels to assist in steering of the aircraft whilst on the ground, at least part of the shock absorber may be angularly adjustable, adjustment of the angle thereof adjusting the orientation of the wheel support housing, and hence the axes of the wheels. Such adjustment may be achieved using, for example, a rack and pinion arrangement powered hydraulically or electrically through associated torque links.

Such landing gear assemblies have the advantage that the steering mechanism is located away from the wheel assembly and so is subject to relatively low shock loadings, in use, but the disadvantage that the shock absorber and torque linkage has to be designed in such a manner as to permit the transmission of the steering loads to the wheels.

According to the present invention there is provided a landing gear assembly comprising a wheel support housing rotatably connected to a support member, the wheel support housing containing an electrically powered motor operable to adjust the angular position of the wheel support housing relative to the support member.

It will be appreciated that by using an electrically powered motor located in the wheel support housing to control the angular position of the wheel support housing, the shock absorber or other support device, of which the support member forms part, does not need to be able to rotate or to transmit rotary or angular movement to the wheel support housing and no torque link assembly is required. Consequently, it can be of much simplified form. Further, compared to arrangements in which steering control is achieved hydraulically, control is much easier to achieve.

The electrically powered motor may be of the radial flux type, or could be an axial flux, pancake motor. The use of an electric pancake motor may be advantageous in that further space saving may be possible.

Conveniently, the wheel support housing further houses a gear train mechanism, for example in the form of an epicyclic gear arrangement, connected to the output of the electrically powered motor.

Preferably, a clutch arrangement is provided, disengagement of the clutch arrangement permitting angular movement of the wheel support housing relative to the support member independently of the operation of the electrically powered motor.

One or more sensors may be provided to allow monitoring of the angular position of the wheel support housing relative to the support shaft. The sensor may comprise, for example, a Hall effect sensor, a shaft position encoder or an RVDT.

The support member preferably comprises a lower piston tube or shaft of a shock absorber, the lower piston tube being keyed to an upper piston tube or shaft of the shock absorber. Conveniently, the upper and lower piston tubes are keyed to one another by a ball spline coupling, which enhances the stiffness of the assembly.

Figure 2:
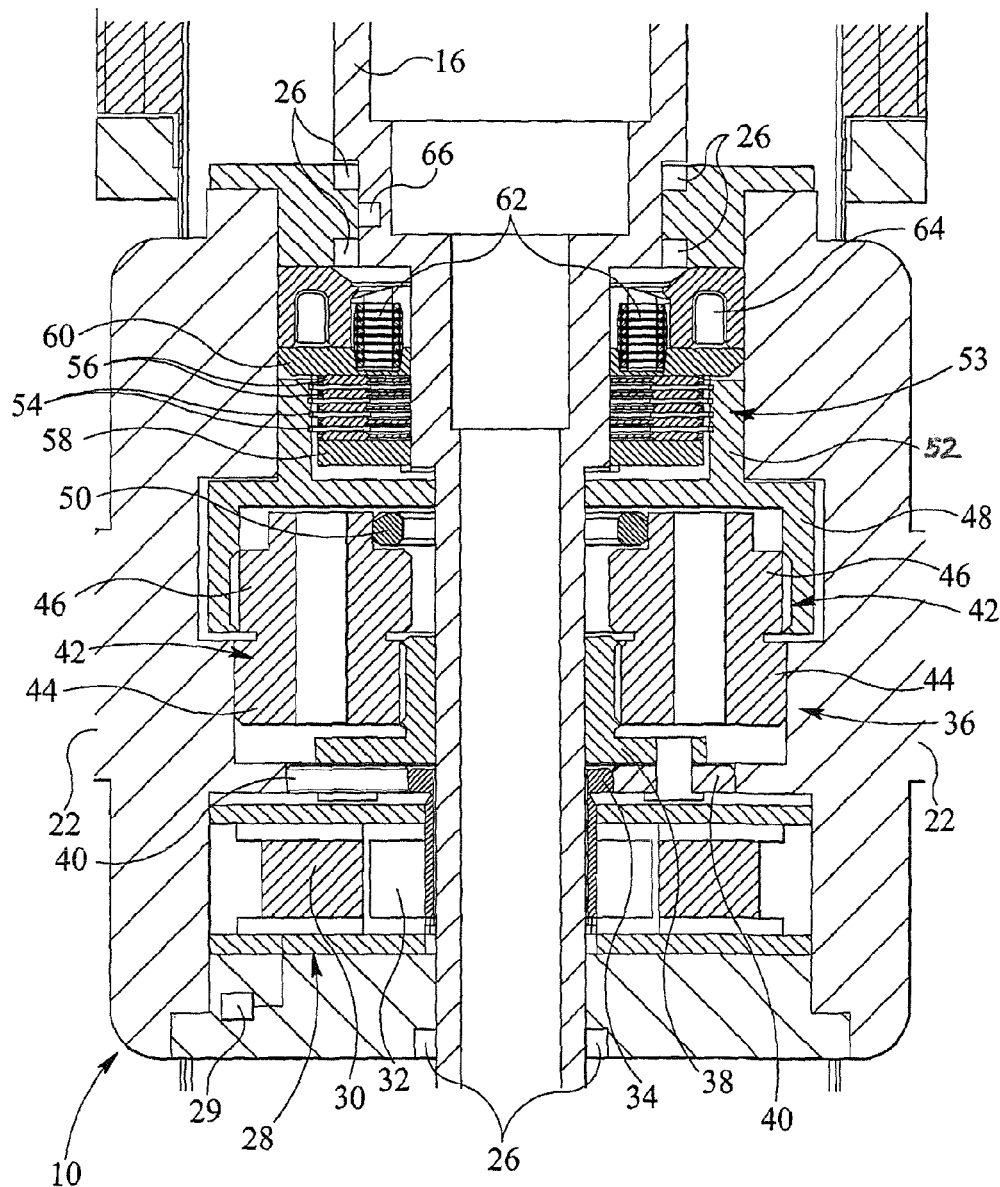

The invention will further be described, by way of example, with reference to the accompanying drawings, in which:

FIG. 1 is a view illustrating part of a landing gear assembly in accordance with one embodiment of the invention; and FIG. 2 is a view, to a larger scale, and in greater detail, illustrating part of the assembly of FIG. 1.

Referring to the accompanying drawings there is illustrated part of a landing gear assembly comprising a multi-part wheel support housing 10 rotatably mounted to the lower end of a shock absorber 12. The shock absorber 12 is connected to the remainder of an aircraft's nose landing gear (not shown) and comprises an upper, outer piston tube 14 and a lower, inner piston tube 16, the inner and outer piston tubes 14, 16 being dimensioned to allow telescoping movement therebetween. A piston member 18 is located within the inner piston tube 16 and forms a seal therewith in the usual manner. A ball spline coupling 20 is provided between the upper and lower piston tubes 14, 16 the coupling 20 accommodating relative axial movement therebetween but preventing or substantially preventing relative angular movement therebetween such that the lower piston tube 16 is non-rotatably mounted to the remainder of the landing gear, thereby enhancing the stiffness of the assembly.

The wheel support housing 10 incorporates a pair of axle regions 22 arranged coaxially with one another and adapted to support associated wheels 24 for rotation relative to the wheel support housing 10.

As best shown in FIG. 2, the wheel support housing 10 is rotatably mounted to the lower piston tube 16 by a series of bearings 26, thus the lower piston tube 16 forms a support member for the wheel support housing 10. The bearings 26 accommodate rotary or angular movement of the wheel support housing 10 relative to the lower piston tube 16, but prevent or restrict relative axial movement therebetween.

Located within the wheel support housing 10 is an electrically powered motor 28. In the arrangement illustrated, the motor 28 is a radial flux motor of relatively short axial length, but it will be appreciated that other forms of electrically powered motor may be used. For example, it may be preferred to use an axial flux motor, and the use of a pancake motor may be preferred as this may allow additional space savings to be made. The motor 28 comprises a stator 30 which is fixed relative to the wheel support housing 10, and a rotor 32 which is rotatable relative to the wheel support housing 10 when the motor 28 is operating. The rotor 32 is coupled to an output gear 34 which encircles but is free to rotate relative to an adjacent part of the lower piston tube 16.

The output gear 34 is arranged to serve as an input, in use, to an epicyclic gear train 36. The gear train 36 includes a sun gear 38 upon which a series of idler gears 40 are mounted. The sun gear 38 encircles, but is free to rotate relative to, the lower piston tube 16. The idler gears 40 are each in meshing engagement with the output gear 34 and also with teeth formations (not shown) provided on the adjacent part of the wheel support housing 10. It will be appreciated that, in use, upon operation of the motor 28, the output gear 34 rotates and this drives each idler gear 40 for rotation about its respective axis of rotation. The meshing of the idler gears 40 with the teeth formations provided on the wheel support housing 10 causes the idler gears 40 to precess around the lower piston tube 16, hence driving the sun gear 38 for rotation. The precise number of idler gears 40 provided is not important and it is envisaged that around six such gears will be provided. The provision of this arrangement results in the sun gear 38 rotating, in use, at a speed lower than the output gear 34.

The gear train 36 further includes a plurality of planetary gears 42, each of which includes a first toothed region 44 which meshes with both the sun gear 38 and with tooth formations (not shown) provided on the adjacent part of the wheel support housing 10, and a second toothed region 46 which meshes with teeth provided on an output ring gear 48. In operation, the output ring gear 48 is held against rotation relative to the lower piston tube 16 by a clutch arrangement 53 as will be described below. The first and second toothed regions 44, 46 of the planetary gears 42 have a slightly different number of teeth to one another, for example the number of teeth may differ by only one or two. It will be appreciated that rotation of the sun gear 38 results in the planetary gears 42 each rotating about its respective axis of rotation, and the meshing between the planetary gears 42 and the wheel support housing 10 causes the planetary gears 42 to precess around the lower piston tube 16. The precessing motion of the planetary gears 42, in combination with the small difference in the number of teeth between the first and second regions 44, 46 of the planetary gears 42 results in the wheel support housing 10 being driven for rotation or angular movement relative to the fixed, or earthed, output ring gear 48. The speed at which the wheel support housing 10 is driven relative to the fixed output ring gear 48 is much lower than the rotary speed of the rotor 32 and output gear 34.

An annular support member 50 engages the planetary gears 42, supporting the gears 42 for movement as described hereinbefore.

The output ring gear 48 is shaped to define a cylindrical upstand 52 within which a clutch arrangement 53 is provided. The clutch arrangement 53 comprises a first series of clutch plates 54 which are keyed or splined to the upstand 52 so as to be rotatable or angularly movable therewith but to be capable of limited axial movement. Interposed between the clutch plates 54 are a second series of clutch plates 56 which are splined or keyed to the lower piston tube 16 so as to be rotatable or angularly moveable therewith and capable of limited axial movement relative thereto. A shoulder member 58 is secured to the lower piston tube 16, and an armature 60 is biased by means of springs 62 towards the shoulder member 58. The clutch plates 54, 56 are located between the armature 60 and the shoulder member 58, thus the biasing of the armature 60 urges the clutch plates 54, 56 into engagement with one another, thereby restricting relative angular movement therebetween, and hence between the lower piston tube 16 and the output ring gear 48.

An actuator including a toroidal coil 64 is arranged to move the armature 60 against the action of the springs 62, when energised, to permit relative angular movement to occur between the clutch plates 54, 56, and hence allow relative movement between the lower piston tube 16 and the output ring gear 48.

In normal use, the coil 64 is deenergised, and so the springs 62 serve to urge the armature 60 to a position in which the clutch plates 54, 56 are compressed, thus the clutch is engaged and the output ring gear 48 is secured against significant angular movement relative to the lower piston tube 16. In this condition, operation of the motor 28 under the control of an electronic motor controller 29, and gear train 36, to drive the output ring gear 48 for rotation relative to the wheel support housing 10 will cause the wheel support housing 10 to move, angularly, relative to the lower piston tube 16, and hence relative to the remainder of the landing gear, thereby changing the orientation of the axes of the wheels 24 and achieving steering. When the motor 28 is not operating, the nature of the gear train 36 is such that a very large external load would need to be applied to the wheel support housing 10 to achieve angular movement thereof, and so the wheel support housing 10 is effectively braked against such movement.

Should it be desired to allow the angular position of the wheel support housing 10 to be adjusted by the application of an external loading, then the coil 64 is energised resulting in movement of the armature 60 against the action of the springs 62, reducing the compression of the clutch plates 54, 56 and effectively disengaging the clutch 53. The disengagement of the clutch 53 allows the output ring gear 48, and hence, via the gear train 36, the wheel support housing 10, to undergo angular movement relative to the lower piston tube 16 under the action of such an externally applied loading.

Although the clutch 53 described hereinbefore is of the type which is engaged when the coil is deenergised, energisation of the coil disengaging the clutch, arrangements which operate in the opposite manner, ie are engaged when energised and disengaged when deenergised, are also envisaged. Such an arrangement may be preferred in order to provide a deenergised default condition in which the wheel support housing 10 may be readily moved by external forces.

In order to assist in controlling the operation and steering of the landing gear assembly, it may be desirable to provide one or more sensors 66 operable to monitor the angular position of the wheel support housing 10 relative to the lower piston tube 16. The sensors 66 could take a range of forms. For example, they could comprise Hall effect type sensors, shaft position encoders or RVDTs. The output of the sensors 66 may be used by the motor controller 29 in controlling the operation of the motor 28.

As the entire shock absorber 12 is non-rotating, in use, steering being achieved by using the motor 28 and gear train 36 integrally located within the wheel support housing 10 to drive the wheel support housing 10 for angular movement relative to the lower piston tube 16 of the shock absorber 12, it will be appreciated that the provision of torque links to transfer steering torques through the shock absorber and to the wheel support housing can be avoided. Further, the location of the motor 28 permits access thereto for maintenance and servicing operations to be performed in a relatively simple and convenient manner. The use of an electrically powered motor to achieve steering simplifies the associated control system, compared to hydraulically driven arrangements.

It will be appreciated that a number of modifications and alterations may be made to the arrangement described hereinbefore without departing from the scope of the invention.

The invention claimed is:

1. A landing gear assembly comprising a wheel support housing rotatably connected to a support member, the wheel support housing containing an electrically powered motor operable to adjust the angular position of the wheel support housing relative to the support member, a gear train mechanism connected to the output of the electrically powered motor and through which the motor output is transmitted to drive the wheel support housing for movement relative to the support member, and a clutch arrangement through which the motor output is transmitted to drive the wheel support housing for movement relative to the support member, disengagement of the clutch arrangement permitting angular movement of the wheel support housing relative to the support member independently of the operation of the electrically powered motor.

2. An assembly according to claim 1, wherein the electrically powered motor is of the radial flux type.

3. An assembly according to claim 1, wherein the motor comprises an axial flux pancake motor.

4. An assembly according to claim 1, wherein the gear train mechanism comprises an epicyclic gear arrangement.

5. An assembly according to claim 1, further comprising a sensor to allow monitoring of the angular position of the wheel support housing relative to the support shaft.

6. An assembly according to claim 5, wherein the sensor comprises a Hall effect sensor, a shaft position encoder or an RVDT.

7. An assembly according to claim 1, wherein the support member comprises a lower piston tube or shaft of a shock absorber, the lower piston tube being keyed to an upper piston tube or shaft of the shock absorber.

8. An assembly according to claim 7, wherein the upper and lower piston tubes are keyed to one another by a ball spline coupling.

\* \* \* \* \*